US010060677B2

United States Patent
Argenta et al.

(10) Patent No.: US 10,060,677 B2
(45) Date of Patent: Aug. 28, 2018

(54) EQUIPMENT FOR MEASUREMENT AND CONTROL OF LOAD MATERIAL OR SCRAP FEEDING INTO A FURNACE AND RELATIVE METHOD

(71) Applicants: Paolo Argenta, Savona (IT); Silvio Reali, Milan (IT); Claudio Lodati, Milan (IT); Mauro Bianchi Ferri, Milan (IT)

(72) Inventors: Paolo Argenta, Savona (IT); Silvio Reali, Milan (IT); Claudio Lodati, Milan (IT); Mauro Bianchi Ferri, Milan (IT)

(73) Assignee: TENOVA S.P.A., Milan (IT)

( * ) Notice: Subject to any disclaimer, the term of this patent is extended or adjusted under 35 U.S.C. 154(b) by 222 days.

(21) Appl. No.: 14/882,398

(22) Filed: Oct. 13, 2015

(65) Prior Publication Data
US 2016/0061529 A1    Mar. 3, 2016

Related U.S. Application Data

(63) Continuation of application No. 11/887,871, filed as application No. PCT/EP2006/003529 on Apr. 7, 2006, now Pat. No. 9,170,050.

(30) Foreign Application Priority Data

Apr. 13, 2005 (IT) .............................. MI2005A0626

(51) Int. Cl.
F27D 13/00 (2006.01)
F27D 3/00 (2006.01)
(Continued)

(52) U.S. Cl.
CPC .......... *F27D 21/0035* (2013.01); *C21B 13/12* (2013.01); *C21C 5/527* (2013.01);
(Continued)

(58) Field of Classification Search
CPC ......... C21C 5/527; C21C 5/565; C21C 5/567; C21C 5/5294; C21C 2005/5288;
(Continued)

(56) References Cited

U.S. PATENT DOCUMENTS 4,641,319 A    2/1987  Nagai et al.
6,004,504 A   12/1999  Vallomy et al.
(Continued)

FOREIGN PATENT DOCUMENTS

JP    60222908      11/1985
JP    S63201484     8/1988
(Continued)

OTHER PUBLICATIONS

CMP, Advanced process control for electric arc furnaces—A review of the use of sensors and computerized automatic control in EAF steelmaking, CMP Report No. 89-3, Dec. 1989.
(Continued)

*Primary Examiner* — Hung D Nguyen
(74) *Attorney, Agent, or Firm* — Themis Law

(57) ABSTRACT

Equipment for the measurement and control of load material and scrap metal feeding into an electrical arc furnace includes an automatic control device for feeding control of load material or scrap according to the energy supplied to the bath, and a measuring device for the added load material, in correlation with the automatic control device, and a weighing device for the furnace shell, its contents and any other components it may support.

17 Claims, 4 Drawing Sheets

(51) Int. Cl.
*F27D 21/00* (2006.01)
*C21C 5/52* (2006.01)
*C21C 5/56* (2006.01)
*F27B 3/18* (2006.01)
*F27B 3/28* (2006.01)
*F27B 7/28* (2006.01)
*C21B 13/12* (2006.01)
*F27D 19/00* (2006.01)

(52) U.S. Cl.
CPC .............. *C21C 5/567* (2013.01); *F27B 3/183* (2013.01); *F27B 3/28* (2013.01); *F27B 7/28* (2013.01); *F27D 3/0024* (2013.01); *F27D 3/0025* (2013.01); *F27D 19/00* (2013.01); *C21C 2005/5288* (2013.01); *C21C 2300/02* (2013.01); *F27D 2019/0075* (2013.01); *Y02P 10/216* (2015.11); *Y02W 30/54* (2015.05)

(58) Field of Classification Search
CPC ........ C21C 2300/02; F27B 3/18; F27B 3/183; F27B 3/28; F27B 7/28; F27D 2019/0075; F27D 3/0024; F27D 3/0025; F27D 19/00; F27D 21/0035; F27D 19/0075; C21B 13/12; Y02W 30/54; Y02P 10/216
USPC ..... 373/2, 79, 80, 81, 82, 84, 104, 109, 115, 373/122, 138, 142, 151, 156, 159, 163; 266/79, 88, 99; 75/10.63, 10.66
See application file for complete search history.

(56) References Cited

U.S. PATENT DOCUMENTS

| | | | | |
|---|---|---|---|---|
| 2002/0071473 | A1* | 6/2002 | Stercho | F27B 3/085 373/79 |
| 2002/0110175 | A1* | 8/2002 | Stercho | C21C 5/5294 373/79 |
| 2006/0050759 | A1* | 3/2006 | Sedighy | F27B 3/28 373/108 |

FOREIGN PATENT DOCUMENTS

| | | | |
|---|---|---|---|
| JP | H085248 | 1/1996 | |
| WO | 2005052196 | 6/2005 | |
| WO | WO 2005052196 A2 * | 6/2005 | ............ C12C 5/527 |

OTHER PUBLICATIONS

Argenta, P. et al., Associazione Italiana Di Metallurgia, Il convegno del 2000—Atti, Milano, Nov. 8-9-10, 2000, 28 Convegno Nazionale AIM—vol. 1, pp. 519-222.

Vallomy J.A., Retrofitting of the Consteel(R) process at ORI Martin SpA of Brescia, La Revue Metallurgie—CIT Avril 2000, Paris, FR, vol. 97, n. 4, pp. 515-525.

National Iron and Steel Institute, The electric arc furnace i International Iron and Steel Institute Committee on Technology, Brussel 1981, par. 4.4.1-4.4.3.

Taylor, C.R. et al., Electric Furnace Steelmaking, Iron and Steel Society of AIME—AIME, Iron & Steel Society, 1985, pp. 12-15.

* cited by examiner

Fig. 3
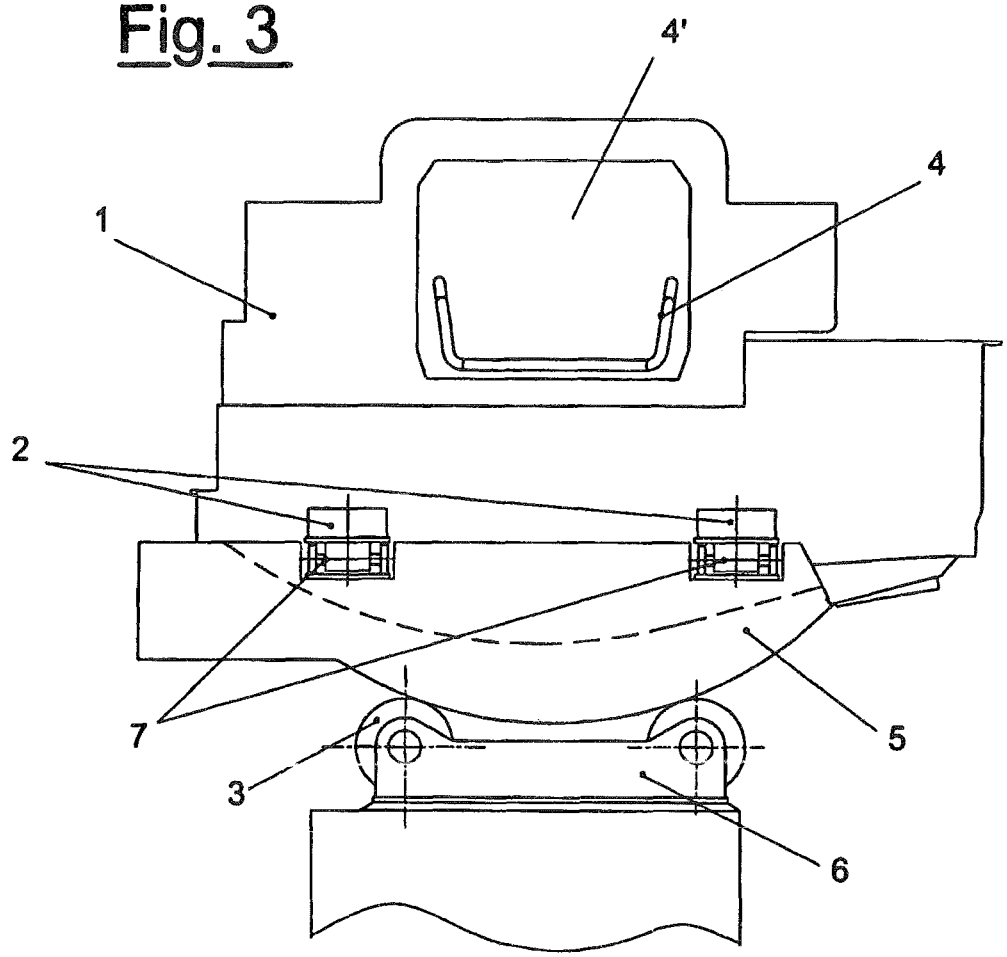
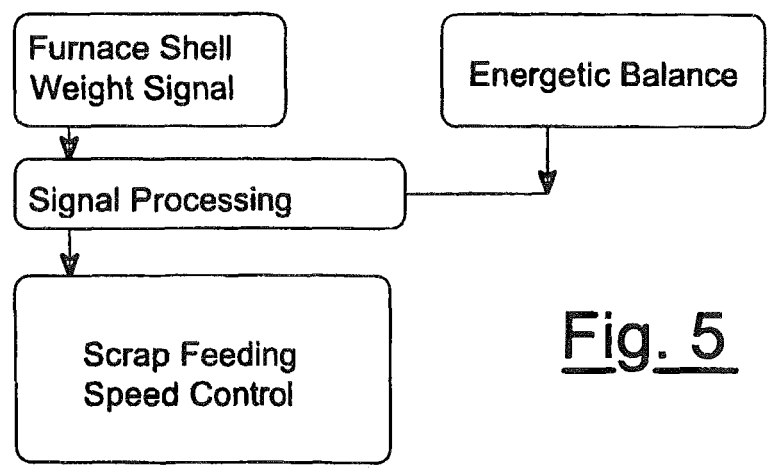
Fig. 5

EQUIPMENT FOR MEASUREMENT AND CONTROL OF LOAD MATERIAL OR SCRAP FEEDING INTO A FURNACE AND RELATIVE METHOD

FIELD OF THE INVENTION

The present invention relates to equipment for the measurement and control of feeding load material and scrap into a furnace and the relative method, in particular for the measuring and control of continuous feeding.

BACKGROUND OF THE INVENTION

The use of continuous systems for loading scrap metal into a furnace, in particular in an electric arc furnace (EAF) for steel production, systems such as CONSTEEL® for example, and/or the addition of previously reduced material to the bath, involves the need for maintaining direct control of the load material flow as it enters the furnace.

In fact, if the continuous addition of load material in solid state is not continuously and correctly controlled, this can cause problems that reduce the overall efficiency of the productive cycle. Among these problems, the most important is the formation of thickened solid material in the scrap unloading zone in the furnace, as it maintains this consistence for a long period of time, thus prolonging the smelting time in the furnace, and as a result, prolonging the whole productive cycle.

This control is equally as important in order to guarantee that the electrical power supply to the electrodes is as homogeneous as possible, also avoiding direct contact between solid material and the electrodes, a contact that could cause the rupture of the electrodes.

In normal practice, said control is performed by an operator, the line controller, who manually regulates the scrap loading system speed according to his personal experience and his impression of the amount of load material or scrap loaded in the furnace. Naturally this operator must be extremely familiar with the process and the installation, and in any case his decisions can still always be affected by uncertain and not very reliable data reading.

One solution for resolving these problems was to provide for the inclusion of continuous furnace shell weight control means.

To achieve this aim, two types of measurement were developed: an indirect furnace shell weight control method based on the level of the liquid metal, and a more direct control method based on sensors that measure the system weight.

The indirect control method is based on geometric methods which, beginning with a reading of the liquid level, convert this data to volume data (and therefore weight), a conversion that clearly depends on the presumed profile of the refractory tank inside the furnace shell.

However, the furnace shell profile is strictly linked with erosive phenomena that the liquid metal provokes in the refractory, phenomena, which are often violent and unpredictable. Inevitably with time, this causes a lack of precision in the taring curve used to compare the level reading and the volume calculation. Considering said lack of precision and the high specific weight of iron, the measured data will reveal quite a large error, and therefore this technique cannot be used for precision control.

In the case of the direct control method, a method that is based on a direct weighing of the furnace shell structure, the weight reading systems must be located in specific zones such as support uprights and beams, which however, support not only the weight of the furnace shell, but also all the support structures, systems and sub systems of the furnace. Therefore the amount of the load material or scrap metal included constitutes only a limited percentage fraction of the measured weight, and this involves all the various aspects of lack of precision. This lack of precision becomes so great that any measurements performed can be considered reliable only as far as quality is concerned.

In the case of wheel mounted tilting furnaces (and with the weighing system on the wheels), it is the weight of the furnace shell tilting system that must be able to resist strong mechanical stress, to raise the total read weight sacrificing measurement precision.

SUMMARY OF THE INVENTION

The general aim of the present invention is therefore to resolve the aforesaid problems in a simple, economical and particularly functional manner.

It is an object of the present invention an equipment for measuring and controlling load material or scrap metal feeding into an electric arc furnace, having an automatic device to control load material or scrap metal feeding according to the energy supplied to the bath, plus a device for measuring the amount of added load material, in correlation with the automatic control device, comprising a device to weigh the furnace shell, its contents and any other components it may support.

It is another object of the present invention is a method for measuring and controlling the feeding of the load material or scrap metal into an electric arc furnace that includes the following steps:
  weighing of the load material or scrap metal added to the bath, performed by a device that weighs the furnace shell, its contents and any other components it may support;
  data acquisition of a measurement reading of the amount of load material or scrap metal added to the bath, supplied by the weighing device, said reading being differential over a period of time for example;
  optimizing the load flow according to suitable algorithms, obtained by adjusting the feeding speed of the load material or scrap metal according to the energy supplied to the bath;

Preferably, the feeding of the load material or scrap metal into an electric arc furnace should be continuous.

In particular, the weighing device of the furnace shell and of any other components it may support provides for a support structure for the furnace shell composed of support rollers.

The function of such rollers is to recover any deviation in shape induced by the heat cycle.

Furthermore the weighing device operates with dual redundancy, at least on two of the support rollers that comprise the measuring rollers. Therefore, preferably at least two support rollers mounted on the equipment according to the present invention act as measuring rollers.

The measuring rollers are equipped with sensors for direct or indirect weight reading.

A third support roller can also act as a measuring roller equipped with sensors for direct or indirect weight reading.

In particular, also, the automatic device for controlling the feeding of the load material or scrap metal includes connection and control systems for the means used to feed or load the load material or scrap. Basically, the automatic device or system for management and control, acquires a reading of the precise measurement supplied by the weighing device, differential over a period of time, which measures in a continuous manner the amount of load material or scrap metal added to the bath, by weighing the furnace shell, its contents and all components it may support.

According to the algorithms for optimizing the load flow, the automatic management and control system thus operates on the scrap metal feeding speed to prevent any solid agglomerates that form from being sent into the bath at any energy level whatsoever (electrical and/or chemical).

A main advantage of the equipment and method according to the present invention, is the fact that by controlling the ratio between the supplied energy and weight of loaded material (scrap), the temperature of the liquid metal can be controlled, maintaining it close to the ideal value for the cycle, and being able to operate constantly at the maximum energy yielded to the bath, and therefore contributing towards raising the productive efficiency.

Furthermore, this helps prevent any human errors caused by lack of precision in operating condition calculations.

Yet a further advantage is the reduction in requests for technical information from the head operator on the line, who will have the support of a system able to analyze conditions in real time and thus help him to make the appropriate decisions automatically and in real time.

As far as the weighing device is concerned, the solution adopted according to the present invention is particularly advantageous, as it is based on a choice of general furnace configuration derived from a well-tested design and constructive scheme, but with the addition of a data acquisition method that is absolutely innovative.

The constructive scheme of the proposed furnace is based on the separation of the various functions: the function of containing the smelted material requires a compact structure, as light as possible, comprised of only the furnace shell and any other components it may support. The support and tilting of the furnace shell (during tapping, the complete emptying of the furnace shell for maintenance or remaking) require a support structure from underneath. This configuration has been demonstrated as the most suitable for the application of the weighing system since it is that which provides the best ratio between treated material, in other words, the load material or scrap metal to be fed into the furnace, and the total weight applied on the weighing system.

In fact, in the solution according to the present invention, the furnace shell weighs on the support structure by means of the rollers, whose additional function is to recover any deviation in shape induced by the heat cycle. Such rollers support the structure involved in smelting as little as possible, and therefore they are the best solution for providing efficient instrumentation aimed at monitoring the weight of the scrap metal to be added.

Given the geometry of the coupling between the furnace shell and the support structure however, other embodiments are possible, such as precision measuring systems to calculate the distance between the furnace shell body and the support structure or any furnace shell weighing system suitable for controlling scrap metal or load material feeding.

The equipment and method according to the present invention are also applicable to all operating methods that involve the addition of liquid or solid metal, in a more or less continuous manner during the operating cycle.

Although the particular equipment and method for the measuring and control of load material and scrap metal feeding into furnaces for steel production, is closely linked with the specific constructive scheme of the furnace shell, it can also be applied to other methods. It is another object of the present invention to provide a method for steel refining comprising:
  continuous preheating of the load material;
  feeding of said material containing iron, directly reduced iron, or a blend of both into an electric arc furnace in order to perform smelting and refining operations;—feeding of elements to form slag in the bath for steel production;
  introduction of carburizing elements into the furnace for steel production;
  electrical heating of the load using electrodes to melt the load and form a bath of melted metal in the furnace with a layer of melted slag on said melted metal bath;
  maintaining said slag in a foamy condition during the steel production process;—feeding of metal elements, as slag formers, and carburizing elements into said furnace;
  maintaining full electrical power capacity in said furnace for the total loading, smelting and refining time;
  intermittent tapping from the furnace maintaining a liquid metal heel inside the furnace shell, said liquid metal heel approximately representing a weight that varies between 10% and 30% of the weight prior to tapping;
  such method being characterized in that the load material or scrap metal feeding step, that is materials containing iron, directly reduced iron, or a blend of both, in an electric arc furnace, comprises the following sub-steps:
    weighing of the load material or scrap metal added to the bath, supplied by a weighing device through the weighing of the furnace shell, its contents and any components it may support.
    data acquisition of a measurement reading of the amount of load material or scrap metal added to the bath, and supplied by the weighing device, differential in time for example.
    optimizing the load flow according to suitable algorithms through regulating the load material or scrap metal feeding speed, according to the energy supplied to the bath.

It is another object of the present invention to provide equipment for refining steel comprising:
  an electric arc furnace for steel production, for smelting and refining a load of metal inside the furnace;—electrodes that extend inside the furnace as far as the intermediate slag level and the level of the smelted material contained in the bath;
  a feeding means connected to said furnace for the introduction of load materials inside said furnace without the removal of the electrodes;
  post-combustion means associated to cooperate with said feeding means in order to preheat the load materials inside said feeding means;
  means for measuring and controlling load material or scrap metal feeding composed of an automatic control means for the load material or scrap metal, and a means for measuring the added load material, in correlation with the automatic control device;
  a hermetically sealed mechanical device located in the inlet section of the load material or scrap metal to the feeding means;
  gas injection means that communicate with said furnace above and/or below the normal melted metal level in the bath; and
  means for tilting said furnace for slagging and tapping operations, the tapping means being positioned in a manner so that said slant of said furnace will maintain a heel of melted liquid material inside said bath, said heel having a weight that varies approximately between 10% and 30% of the weight prior to tapping.

BRIEF DESCRIPTION OF THE DRAWINGS

The structural and functional characteristics of the present invention and its advantages in relation to prior technical art will be made clearer and more obvious from the following description, with reference to the appended drawings wherein:

FIGS. 3 and 4 are side elevation views of an embodiment of the system according to the present invention;

FIG. 5 is a block diagram of the method according to the present invention.

DETAILED DESCRIPTION OF EMBODIMENTS OF THE INVENTION

Figure 1:
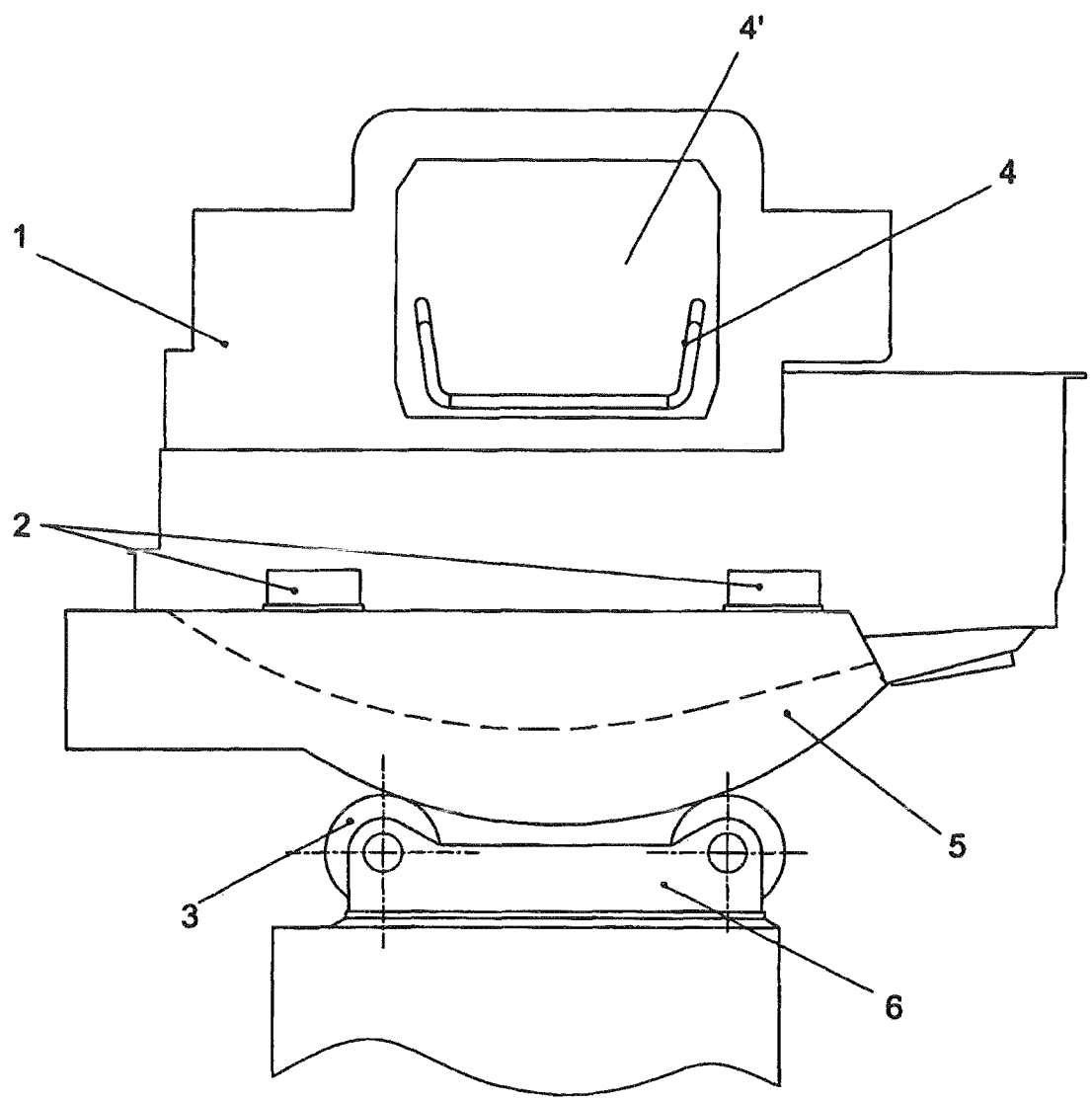
FIGS. 1 and 2 are side elevation views of technical solutions according to the state of the art.

In particular, FIG. 1 shows an EAF furnace whose tilting platform (5) (for slagging, tapping or emptying operations) is supported by wheels (3) positioned on support bases (6).

The furnace shell (1) is set by means of suitable supports (2) on the tilting platform (5).

The side opening (4') is used to feed the scrap metal, by means of a conveyor (4) if necessary, with a continuous feeding procedure such as that provided by the CONSTEEL® system, for example. The traditional configuration is sometimes equipped with instruments for reading the weight by means of sensors located in the axes of the EAF furnace support wheels (3).

Figure 4:
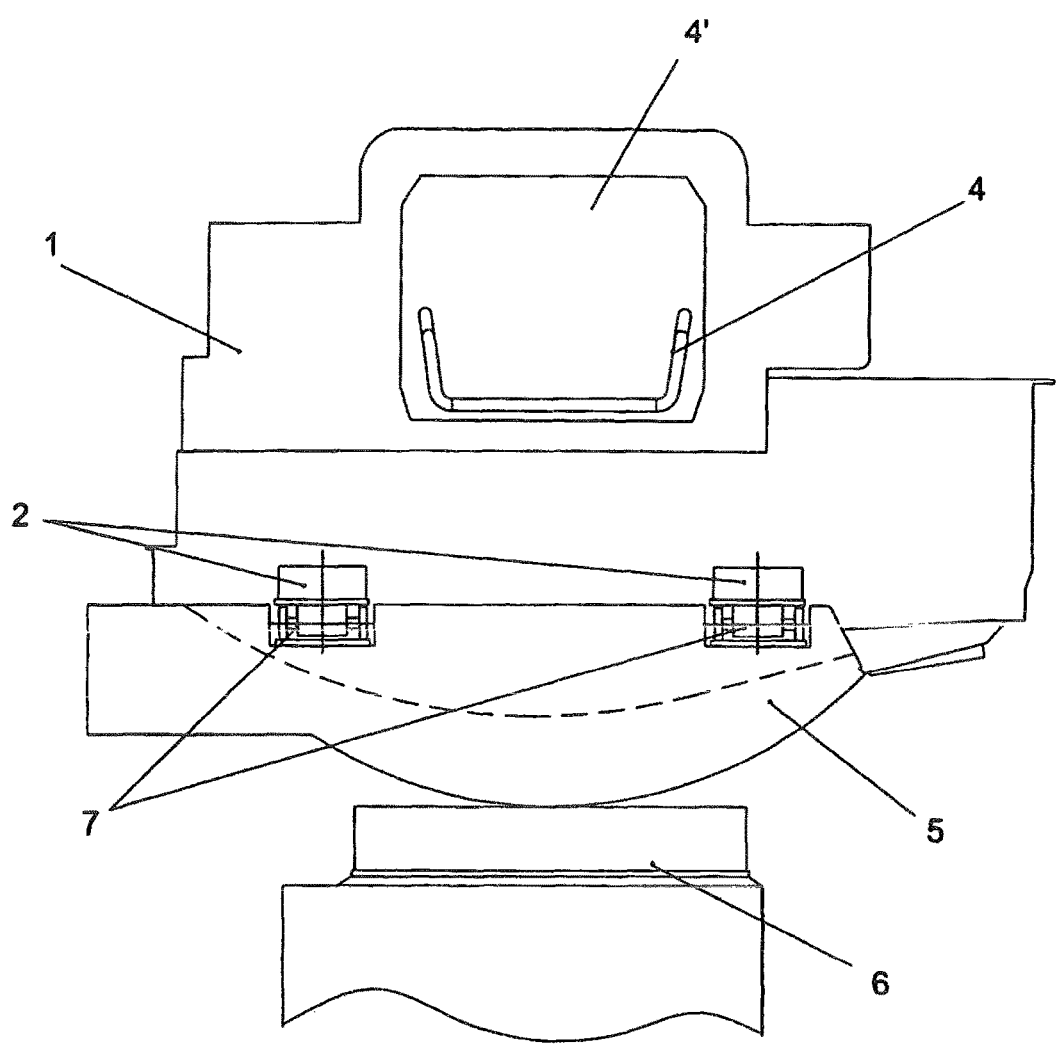

On the other hand, the embodiment shown in the FIGS. 3 and 4 refers to the invention according to the present invention. The tilting platform (5) is mounted on the support base (6), and the furnace shell (1) is set on suitable supports (2) on the platform. In order to allow for structural settling due to the temperature, the furnace shell support system is composed of at least two rollers (7). The weight readers or sensors are mounted inside such rollers (7).

Purely as an example, and by no means in a limiting manner, these sensors can be mounted with dual redundancy in the roller (7) axes and be composed of shearing stress sensors. The weighed portion is composed of the furnace shell (1) only, as shown in FIG. 3, which weighs much less than that shown in FIG. 1 (furnace shell (1) plus tilting platform (5)), and therefore the sensors in the rollers (7), under less strain, can be designed with far greater precision capacity.

The data acquisition reading (see FIG. 5) together with a suitable calculation algorithm, permits step monitoring of the scrap metal feeding into the furnace shell (1) in real time through the opening (4') by means of the conveyor (4). The data acquisition system (FIG. 5) then processes said information, also according to the energy at the furnace inlet, making it available for the line operator, as well as for the continuous scrap metal feeding control system (4) as described in FIG. 5 (such as the Consteel® system, for example).

Figure 2:
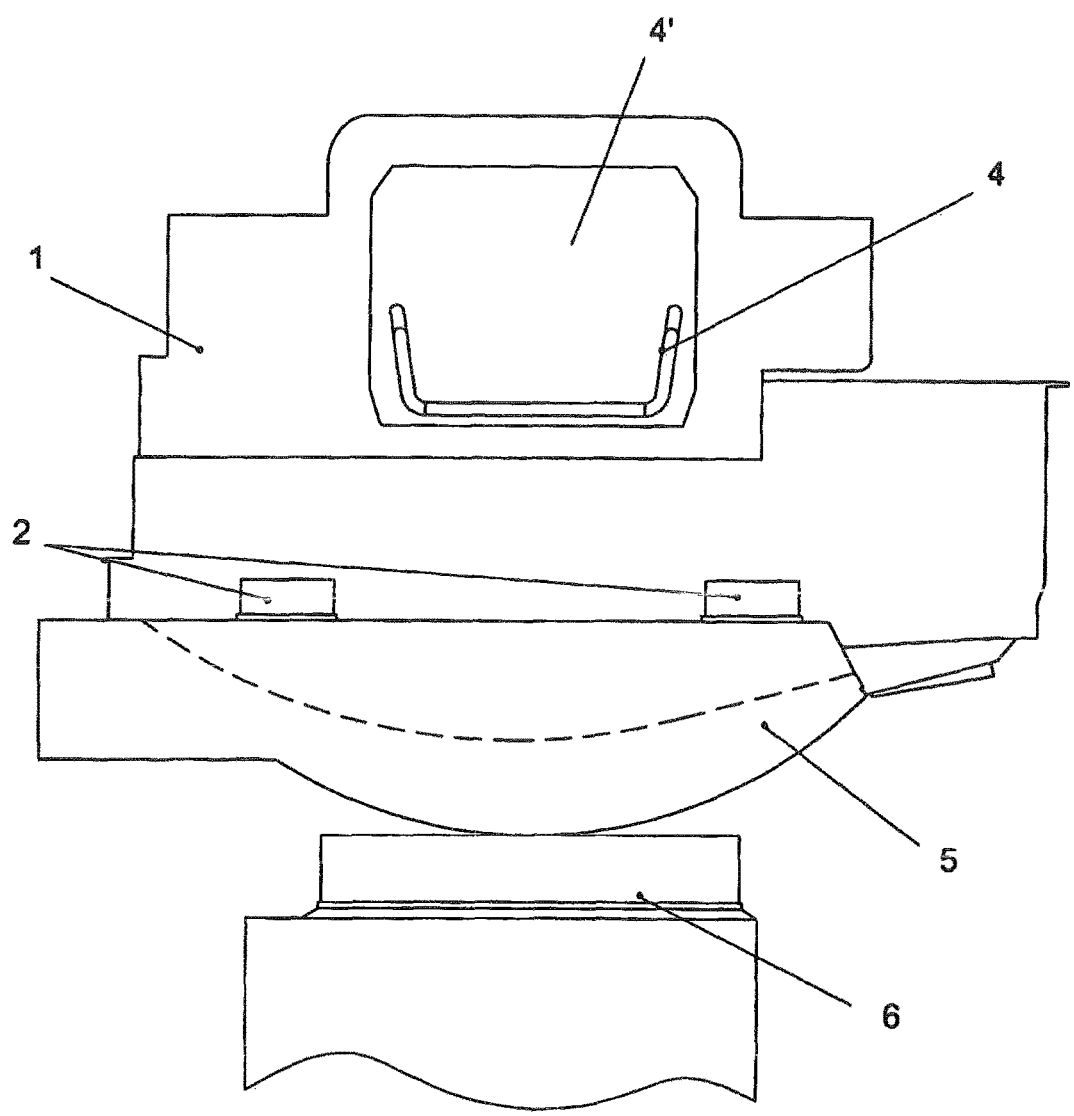

Alternatively, in the case of tilting furnaces without wheels (as in the type shown in FIG. 2 in the version according to present state of the art) whose weight is not nearly as easily measured, the application of the solution according to the present invention allows real time measurement (FIG. 4) of the load material and has a considerable influence on the simplification of the construction of EAF furnace systems with possible continuous feeding equipment (the Consteel® system, for example).

The term load material or "scrap metal" used in the present description and in the subordinate claims refers to the load material for continuous smelting, comprised of iron scrap, cast iron, directly reduced iron in the form of peens or fragments and/or a blend of both.

In particular, through data acquisition measurement reading of the amount of load material or scrap metal added to the bath by means of the weighing device, differential in time for example, load flow optimizing can be calculated according to suitable algorithms. According to this data, the equipment and method management and control device regulates the load material or scrap metal feeding speed.

The invention claimed is:

1. Equipment for measurement and control of load material and scrap metal feeding into an electrical arc furnace resting on a tilting platform, the equipment comprising, in combination:
    an automatic control device for feeding load material or scrap according to energy supplied to a bath; and
    a measuring device for added load material, correlated with the automatic control device, comprising a weighing device for weighing a furnace shell, contents thereof and any other components supported by the furnace shell,
    wherein the weighing device is disposed within at least two rollers positioned between the electric arc furnace and the tilting platform, the rollers providing a support structure to the electric arc furnace.

2. The equipment according to claim 1, wherein the measuring device further comprises a data acquisition system of a reading of a measurement supplied by the weighing device.

3. The equipment according to claim 1, wherein the weighing device comprises sensors with dual redundancy.

4. The equipment according to claim 3, wherein the sensors are shearing stress sensors.

5. The equipment according to claim 1, wherein there are three rollers, and wherein the weighing device comprises sensors for direct or indirect weight reading.

6. The equipment according to claim 1, wherein the automatic control device for feeding the load material or scrap metal provides connection and control systems on a feeding or loading system for the load material or scrap metal.

7. The equipment according to claim 1, wherein the automatic control device for feeding the load material or scrap metal is arranged to feed the load material or scrap metal into the furnace continuously.

8. A method of measuring and controlling load material or scrap metal feeding into an electric arc furnace resting on a tilting platform, comprising:
    weighing added load material or scrap metal into a bath, supplied by a weighing device, through weighing of a furnace shell, contents thereof and any other components supported by the furnace shell;
    acquiring data of a measurement reading of an amount of load material or scrap metal added to the bath, supplied by the weighing device; and
    optimizing feed flow according to algorithms, through load material or scrap metal feeding speed regulation according to energy supplied to the bath,
    wherein the weighing device is disposed within at least two rollers positioned between the electric arc furnace and the tilting platform, the rollers providing a support structure to the electric arc furnace.

9. The method according to claim 8, wherein acquiring data of a measuring reading comprises acquiring data of a measurement reading differentially in time.

10. The method according to claim 8, wherein weighing added load material comprises weighing added load material by a weight measuring method.

11. The method according to claim 8, further comprising the step of feeding the load material or scrap metal into the furnace continuously.

12. The method according to claim 11, wherein feeding the load material or scrap metal into the furnace continuously comprises feeding the load material or scrap metal into the furnace continuously during an entire operating cycle.

13. A method of steel refining comprising:
continuously preheating a load material or scrap metal;
feeding said load material or scrap metal containing iron, directly reduced iron or a blend thereof, into an electric arc furnace for smelting and refining, the electric arc furnace being disposed on a tilting platform;
feeding slag forming elements into a bath for steel production;
introducing carburizing elements into the furnace for steel production;
electrically heating said load material or scrap metal with electrodes to melt said load material or scrap metal and form a bath of melted metal inside the furnace, having a layer of melted slag on said bath of melted metal;
maintaining said slag in a foamy condition;
feeding metallic elements acting as slag formers, and carburizing elements into said furnace;
maintaining full electric power capacity in the furnace for a total loading, smelting and refining time; and
intermittent furnace tapping, maintaining a liquid heel of melted metal inside a furnace shell, said liquid heel being equal to a weight between 10% and 30% of the weight prior to tapping,
wherein the feeding step of load material or scrap metal in said electric arc furnace comprises the following sub-steps:
weighing the load material or scrap metal added to the bath, supplied by a weighing device through the weighing of the furnace shell, contents thereof and other components supported by the furnace shell, wherein the weighing device is disposed within at least two rollers positioned between the electric arc furnace and the tilting platform, the rollers providing a support structure to the electric arc furnace;
acquiring data of a measurement reading of an amount of load material or scrap metal added to the bath, supplied by the weighing device, differentially in time; and
optimizing load flow according to algorithms through load material or scrap metal feeding speed regulation, according to energy supplied to the bath.

14. The method according to claim 13, wherein feeding said the load material into the furnace comprises feeding said the load material into the furnace with a continuous feeding.

15. Equipment for steel refining comprising:
an arc furnace for steel production by smelting and refining a metal load inside said furnace;
a conveyor connected to said furnace that is configured to introduce load materials inside said furnace;
a post-combustion station cooperating with said conveyor and configured to preheat the load materials inside said conveyor;
means for measuring and controlling the load material or scrap metal feeding, comprising, in combination, an automatic load material or scrap metal feeding control device, a measuring device for the introduced load material, correlated with said control device and comprising a weighing device for weighing a furnace shell, contents thereof and any other components supported by the furnace shell; and
a tilting platform for tilting said arc furnace for slagging and tapping operations, said tilting platform being positioned such that a slant of said furnace maintains a heel of melted liquid material inside said furnace, said heel having a weight that is between 10% and 30% of the weight prior to tapping,
wherein the weighing device is disposed within at least two rollers positioned between the arc furnace and the tilting platform, the rollers providing a support structure to the electric arc furnace.

16. The equipment according to claim 15, further comprising a data acquisition system reading of a measurement supplied by the weighing device.

17. The equipment according to claim 15, wherein the control device for feeding the load material into the furnace is configured to feed the load material into the furnace continuously.

* * * * *